(12) United States Patent
Fanson

(10) Patent No.: US 8,306,136 B2
(45) Date of Patent: Nov. 6, 2012

(54) COMMUNICATIONS SYSTEM UTILIZING ORTHOGONAL LINEAR FREQUENCY MODULATED WAVEFORMS

(75) Inventor: John Fanson, Woodlawn (CA)

(73) Assignee: Thales Canada Inc., Toronto, Ontario (CA)

( * ) Notice: Subject to any disclaimer, the term of this patent is extended or adjusted under 35 U.S.C. 154(b) by 449 days.

(21) Appl. No.: 12/603,696

(22) Filed: Oct. 22, 2009

(65) Prior Publication Data

US 2011/0096854 A1    Apr. 28, 2011

(51) Int. Cl.
H04B 14/08 (2006.01)
H04L 27/00 (2006.01)
H04L 27/06 (2006.01)
H04L 27/08 (2006.01)

(52) U.S. Cl. ............... 375/260; 375/295; 375/340

(58) Field of Classification Search ......... 375/259, 375/260, 285, 295, 316, 340; 370/208, 210; 455/42, 45

See application file for complete search history.

(56) References Cited

U.S. PATENT DOCUMENTS

| 7,548,726 | B1 | 6/2009 | Rofougaran | |
|---|---|---|---|---|
| 7,580,444 | B2 | 8/2009 | Brown et al. | |
| 7,602,860 | B2 | 10/2009 | Hietala et al. | |
| 2004/0120409 | A1* | 6/2004 | Yasotharan et al. | 375/260 |
| 2007/0165727 | A1* | 7/2007 | Fanson | 375/260 |

* cited by examiner

*Primary Examiner* — Betsy Deppe
(74) *Attorney, Agent, or Firm* — Marks & Clerk; Richard J. Mitchell

(57) ABSTRACT

An orthogonal linear frequency modulation (OLFM) communications system has an OFDM transmitter and receiver communcating data on a series of multiplexed sub-carriers over a communications medium. A linear frequency modulator provided at the transmitter subjects the sub-carriers to linear frequency modulation to produce a series of sub-sweeps for transmission over the communications medium. A linear frequency demodulator at the receiver produces the sub-carriers from the received sub-sweeps for subsequent demodulation to recover the data.

24 Claims, 5 Drawing Sheets

COMMUNICATIONS SYSTEM UTILIZING ORTHOGONAL LINEAR FREQUENCY MODULATED WAVEFORMS

FIELD OF THE INVENTION

The invention relates to high speed communications systems, in particular to systems that utilize multi-carrier orthogonal waveforms.

BACKGROUND OF THE INVENTION

Modern digital high-speed communications systems commonly utilize Orthogonal Frequency Division Multiplexing (OFDM) for robust, high data rate communications over impaired channel conditions. Standard technologies include Home Plug, IEEE 802.11a, IEEE 802.16a, ADSL, Digital Audio Broadcasting, . . . , etc.

OFDM is a frequency division multiplexing scheme that utilizes orthogonal sinusoidal sub-carriers to carry data by modulating the phase and amplitude of each sub-carrier. OFDM's inherent advantage as a bandwidth efficient communications scheme includes its ability to overcome severe channel conditions such as frequency selective fading while being relatively simple to implement.

To optimize the capacity between two OFDM communications devices, the channel conditions for each sub-carrier are typically measured and data bits are assigned to each sub-carrier according to the signal-to-noise ratio (SNR) at the intended receiver. In order for the transmitting node to allocate power to each sub-carrier and to modulate data optimally, the intended receiver will have to define the modulation scheme for each sub-carrier and communicate this to the other device. This optimal modulation scheme has to be exchanged between devices with a decodable, lower data rate modulation scheme before the optimization occurs. This exchange of optimum modulation schemes results in an additional complexity and latency between the two devices and has to be updated whenever channel conditions change significantly (especially for the worse).

Different loading algorithms are used for allocating power to sub-carriers and assigning the number of bits. The SNR is a function of the amount of power allocated to a sub-carrier and the channel. In some cases a maximum power spectral density (PSD) is dictated by regulation or practical considerations. The "water pouring" method for allocating power was introduced by Gallager in 1968 ("Information Theory and Reliable Communication", page 389) and by Wozencraft in 1965 ("Principles of Communication Engineering", pp. 285-357) and involves allocating available energy to sub-carriers based on the inverse of the channel frequency response subject to additive white Gaussian noise (AWGN). The water pouring method is known to be difficult to implement in practice.

SUMMARY OF THE INVENTION

An object of the invention is to provide a communications system and method for high-speed data communications with reduced latency. Embodiments of the invention utilize orthogonal linear frequency modulated (OLFM) waveforms, thus obviating the need for a complex power allocation or bit assignment scheme for more robust communications.

In one aspect the invention provides a transmitter for transmitting a signal over a communications medium to a receiver, comprising a data modulator for outputting a series of orthogonal sub-carriers carrying coded data; a linear frequency modulator for applying linear frequency modulation to said series of sub-carriers to produce a series of sub-sweeps having orthogonal waveforms; and a multiplexor for producing a multiplexed output signal containing said series of sub-sweeps for transmission over said communications medium.

In another aspect the invention provides a communications system comprising a OFDM transmitter and receiver communicating data on a series of multiplexed sub-carriers, the improvement wherein a linear frequency modulator is provided at the transmitter to subject the sub-carriers to linear frequency modulation to produce a series of sub-sweeps and a linear frequency demodulator is provided at the receiver to produce said sub-carriers from the received sub-sweeps.

The multiplexor is typically an inverse discrete Fourier transform block (DFT), and more particularly an inverse fast Fourier transform block.

The communications system may comprise the typical processing blocks of an OFDM communications system (FEC, Interleaver, Mapper, IFFT, AGC, Synchronization, FFT, Equalizer, De-Mapper, . . . ). The novelty lies in the addition of a linear frequency modulation and de-modulation block transforming the sinusoidal sub-carriers to linear frequency modulated sub-sweeps and back again. The sub-carriers form an orthogonal set as in conventional OFDM.

Embodiments of the invention thus define a higher capacity modulation scheme between two communications devices by allocating the same transmit power to each sub-sweep and measuring the average SNR at the receiver that is common to all sub-sweeps and assigning the same bit rate since each sub-sweep experiences the same channel response and has the same data carrying capacity. Also, unlike OFDM sub-carrier optimization, which has to be adjusted whenever the SNR of any particular tone changes, OLFM sub-sweep bit allocation only has to change if there is a net change in the SNR over the entire frequency band adding to the robustness of the system.

Additionally, since each sub-sweep has the same SNR, the linearity (distortion due to non-linear amplifiers and other effects) of the analog front end will necessarily be designed for this average SNR, which is the same for all sub-sweeps compared to the highest SNR for OFDM systems.

The invention can be applied with advantage to single carrier LFM, multi-carrier OFDM and OLFM in a relatively simple way.

As noted the analog front end can have decreased complexity compared to a conventional OFDM system because it is designed for the average SNR instead of the highest as is the case for OFDM systems today. Additionally, the high crest factor (peak to average power), which is a big design criterion for OFDM systems, has less of an impact on OLFM systems.

Finally, when out of band leakage is not much of a consideration, this provides the ability to transmit higher distorted power (either digitally or with more power efficient non-linear amplifiers) and improve throughput relative to OFDM systems

BRIEF DESCRIPTION OF DRAWINGS

The following detailed description, given by way of example and not intended to limit the present invention solely thereto, will best be appreciated in conjunction with the accompanying drawings, wherein like reference numerals denote like elements and parts, where.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Figure 1:
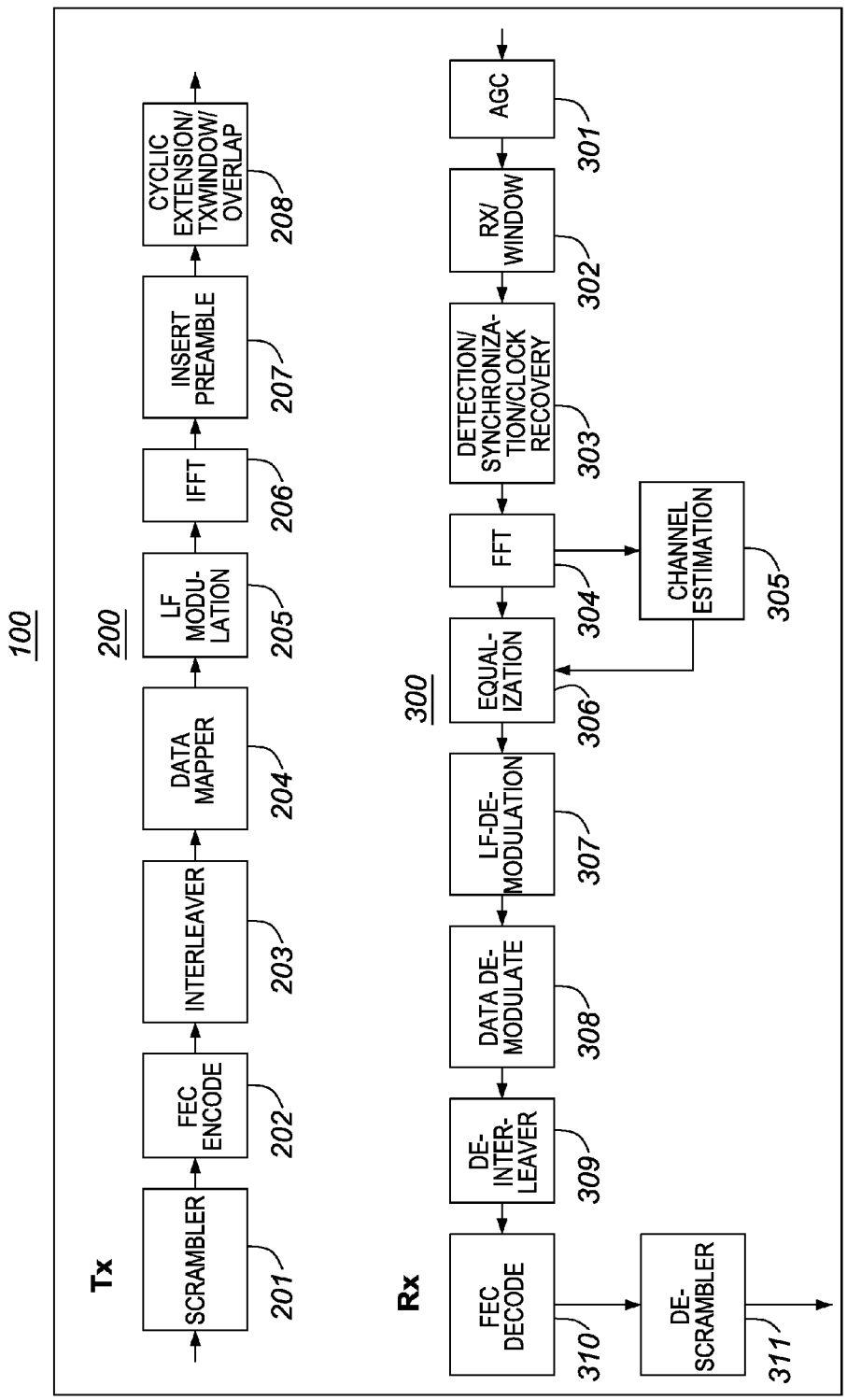
FIG. 1 is a block diagram of an OLFM system according to an embodiment of the invention.

FIG. 1 illustrates the base band digital processing of an OLFM communications system 100 according to an embodiment of the invention and is comprised of a transmitter 200 and receiver 300.

The transmitter 200 comprises an interface to a data stream connected to a data scrambler 201 to minimize the probability of a long sequence of ones or zeros, an FEC encoder 202 to enable data error detection and correction (typically schemes such as Reed Solomon, convolutional, or Turbo coding schemes are utilized), an interleaver 203 used to spread the coded symbols over time (since OLFM spreads a signal over the entire frequency band, interleaving over frequency is unnecessary) to mitigate the effect of burst errors or frequency selective fading, a data mapper 204 to map coded symbols to grey coded constellations for each sub-carrier, an IFFT 206 for transforming the signal from frequency to time domain, an insert preamble block 207 for insertion of special symbols at the beginning of a transmission which is typically utilized by a receiver for automatic gain control, detection, synchronization, clock recovery and for channel estimation, a time domain processing, Cyclic Extension/Tx Window/Overlap block 208, which cyclically extends symbols to account for any channel spreading and timing errors at the receiver as well as windowing and overlapping to mitigate against out of band spectral leakage. These blocks are generally similar to those known in the art for a conventional OFDM system and will not be described in detail. The data mapper 204 is of the type described in the IEEE 802.11a/g standard. However, since all sub-carriers carry the same number of bits, there is no need to provide for varying the number of bits per channel.

The data output from block 208 is then provided to any additional blocks for band shifting or preprocessing as required by a particular system to an analog front end to convert the waveform to the appropriate analog signal, for example, for wired or wireless transmission.

In accordance with an embodiment of the invention, the communications system additionally comprises an LF Modulation block 205 downstream of the data mapper 204. This is shown in the frequency domain upstream of the IFFT 206, but it will be understood that it can also be placed in the time domain downstream of the IFFT 206. The LF modulation block 206 transforms the sinusoidal sub-carriers to orthogonal LFM sub-sweeps extending across the entire frequency band. The LFM block will be described in more detail below.

The receiver 300 comprises an interface to the appropriate analog front end connected to a AGC 301 used to adjust the gain of the system to prevent saturation and set the signal level appropriately, a receiver window 302 to prevent any unwanted leakage from narrowband signals contaminating nearby tones, a detection/synchronization/clock recovery block 303 to detect the presence of a transmission and to adjust clock, symbol and frame timing so as to accurately detect the symbols in a transmission, an FFT block 304 for transforming the signal from time to frequency domain, a channel estimation block 305 for use in frequency domain equalization, an equalization block 306 to remove the effects of the channel, a demodulation block 308 for decision decoding of complex signals to data symbols, a de-interleaver 309 which performs the inverse function to the interleaver, an FEC decoder 310 which performs an inverse function to the FEC encoder, a de-scrambler 311, which performs the inverse function to the scrambler 201. The above-described blocks are generally conventional for an OFDM receiver and will not be described in further detail. It will also be appreciated that while conventionally the IFFT block is placed in the transmitter and the FFT block is placed in the receiver, the reverse placement would also work.

In addition, in accordance with an embodiment of the invention, the receiver additionally comprises an LF de-modulation block 307 to transform the sub-sweeps back to delta functions in the frequency domain for data demodulation. The LF de-modulation block outputs a series of sub-carriers for input to the data demodulator 308. The LF demodulation block 307 is shown downstream of the FFT 304, but it will be understood that it could also be placed upstream.

As noted above, the set of orthogonal sub-carriers are subjected to linear frequency modulation to produce a series of orthogonal sub-sweeps, wherein the sub-sweeps extend over the entire frequency band. A discrete linear frequency modulated signal can be defined as $$x(n) = e^{j\frac{\pi}{v}(\frac{n}{N})^2 + j\frac{2\pi k_0}{N}n}$$

where n is the sample index from 0 to N−1, $k_0$ is the starting frequency bin and v is the number of frequency bins the LFM waveform is swept over. For $k_0=0$ and v=N, the LFM waveform is a self-reciprocal function of the discrete Fourier transform (DFT), which means that it has the same functional form in both time and frequency domains except for a sign change and phase shift.

The DFT of x(n) is given by $$X(k) = e^{-j\frac{\pi}{N}k^2 + j\frac{\pi}{4}}$$

resulting in quadratic phase modulation in both the time and frequency domain. It can also be demonstrated that for $k_0$ not equal to 0 and v<N that this is true approximately and can be described by $$e^{j\pi v(\frac{n}{N})^2 + j\frac{2\pi k_0 n}{N}} \overset{DFT}{\longleftrightarrow} circshift\left(\left(\begin{array}{cc} \sqrt{\frac{N}{v}}e^{-j\frac{\pi}{v}k^2 + j\frac{\pi}{4}} & \text{for } k = [0:v-1] \\ 0 & \text{otherwise} \end{array}\right), k_0\right)$$

where the circshift function represents the circular band shifting by $k_0$.

Figure 2A:
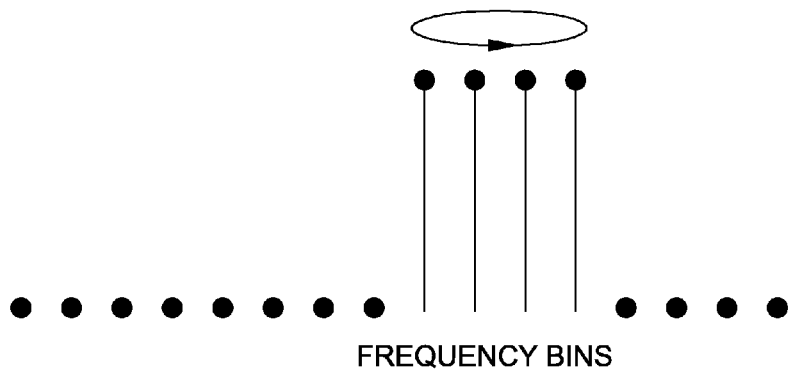
FIG. 2A is an illustration showing the frequency bins of an OFDM system and the circular convolution with the LFM function.

This relationship can be exploited by using the frequency domain approximation of the LFM signal (which is also an LFM signal) to additionally modulate OFDM modulated data 206 output on allocated sub-carriers from the data mapper 204 through circular convolution 400 to convert the sub-carriers to a series of sub-sweeps, where each sub-sweep carries one channel, as illustrated in FIG. 2A. The pi/4 phase shift can be ignored. Circular convolution is defined as $$z(k') = \sum_{m=0}^{v-1} X(m)O(k'-m)_{Modv}$$

where O is the OFDM modulated data and $k'=k-k_0$ for $k=k_0$ to $k_0+v-1$. It should be noted that the LFM waveform has a constant modulus resulting in a single sub-sweep having a constant PSD (Power spectral density). On the receiver side, the LF demodulation process is the same as the LF modulation process in the transmitter except for a complex conjugation of the LFM waveform.

Figure 2B:
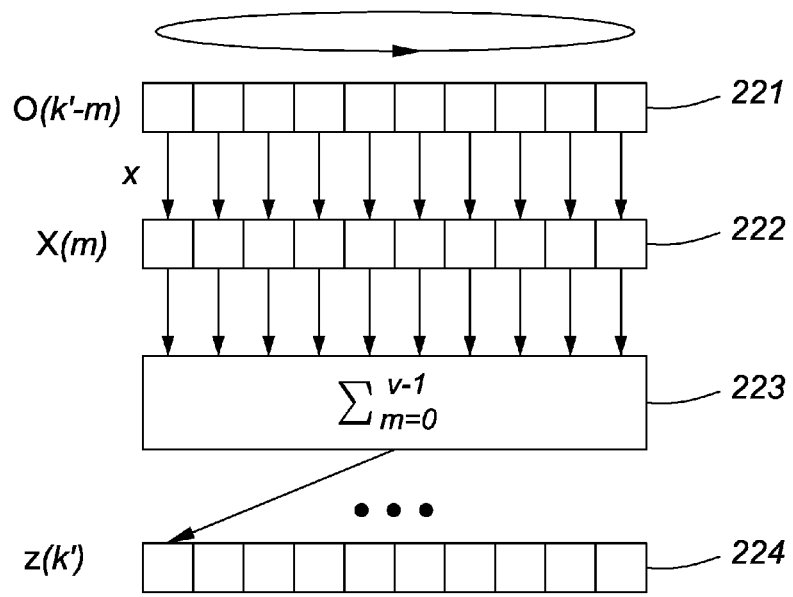
FIG. 2B is a block diagram of an arrangement for implementing the circular convolution function.

The circular convolution process is implemented as shown in FIG. 2B. The OFDM modulated data is stored in circular shift register 221, which is shifted by k'. The data in shift register 221 is transferred through register 222 to summing unit 223, which outputs the data z(k') to register 224

Figure 3:
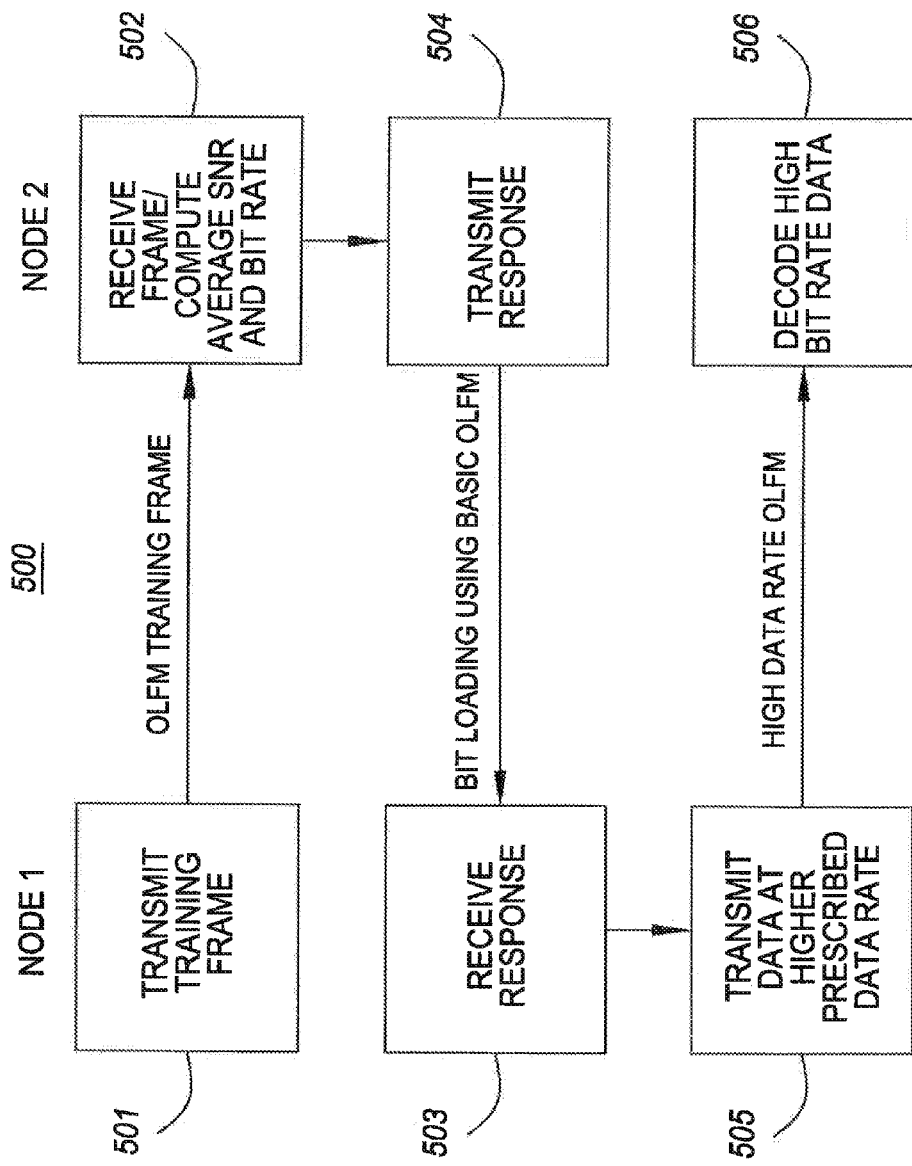
FIG. 3 is a block diagram illustrating the sequence of events for the rate adaptation scheme to allocate the appropriate number of bits to the sub-sweeps based on the received average SNR.

In accordance with embodiments of the invention, the bit rate is adjusted in accordance with the average SNR. The rate adaptation scheme 500 illustrated in FIG. 3 begins by Node 1 transmitting a Training Frame 501 to the intended receiver Node 2, followed by the Node 2 receiving the transmitted training frame (as illustrated in FIG. 1) and computing the average SNR (or similar metric) and computing the appropriate bit loading for a given bit error rate (or symbol error rate, or packet error rate) 502. A response is generated by Node 2 503, and transmitted to Node 1 using a basic, pre-determine low bit rate OLFM transmission that can be reliably received over the channel. Node 1 receives the response 504 and uses the prescribed higher rate bit allocation for subsequent data transmissions 505. Typically, the modulation description is transmitted at the beginning of the frame (after the preamble). For OFDM systems, this description is typically in the form of a pointer to a table of stored values in the transmitter and receiver that they have agreed upon since there can be a significant amount of data used to describe the power and bit allocation for each sub-carrier. Since the bit allocation description amounts to a single variable (the same power and number of bits is transmitted for each OLFM sub-sweep), this can be communicated directly at the beginning of the frame indicating the modulation level for subsequent higher rate data to be decoded at 506.

Unlike the carriers in conventional OFDM, the same transmit power and bit rate is allocated to each sub-sweep. The transmit power for all sub-sweeps is adjusted in accordance with the average SNR for all sub-sweeps. Typical the maximum amount of power allowed by regulation or constrained by practical engineering limitations, such as amplifier capability/cost, battery life, etc., is employed. The power can be increased beyond the linearity region of the amplifier or other components in the transmitter to the point where any distortion component of the noise does not dominate the channel component resulting in an increase in data throughput. The scaling of the power can be done anywhere from the data mapper to the end of the time domain processing since it is a simple scaling of all sub-carriers/sub-sweeps and the DFT is a linear transformation.

The bit rate is adjusted in the data mapper 204 taking into account the transmitted power.

The average SNR can be estimated at the receiver by utilizing a special training frame of known modulation sent by the transmitter. After the frame has been properly acquired, the signal can be demodulated and the channel response, received signal strength and the noise component measured. The SNR is typically measured assuming AWGN as the ratio of the signal to noise power. The number of bits that can be supported by a sub-carrier in OFDM or sub-sweep in OLFM depends on the targeted bit error rate (BER) or symbol error rate (SER). If the training data used for the modulation of the training frame is not known, decision based decoding can be used to estimate the SNR.

Figure 4A:
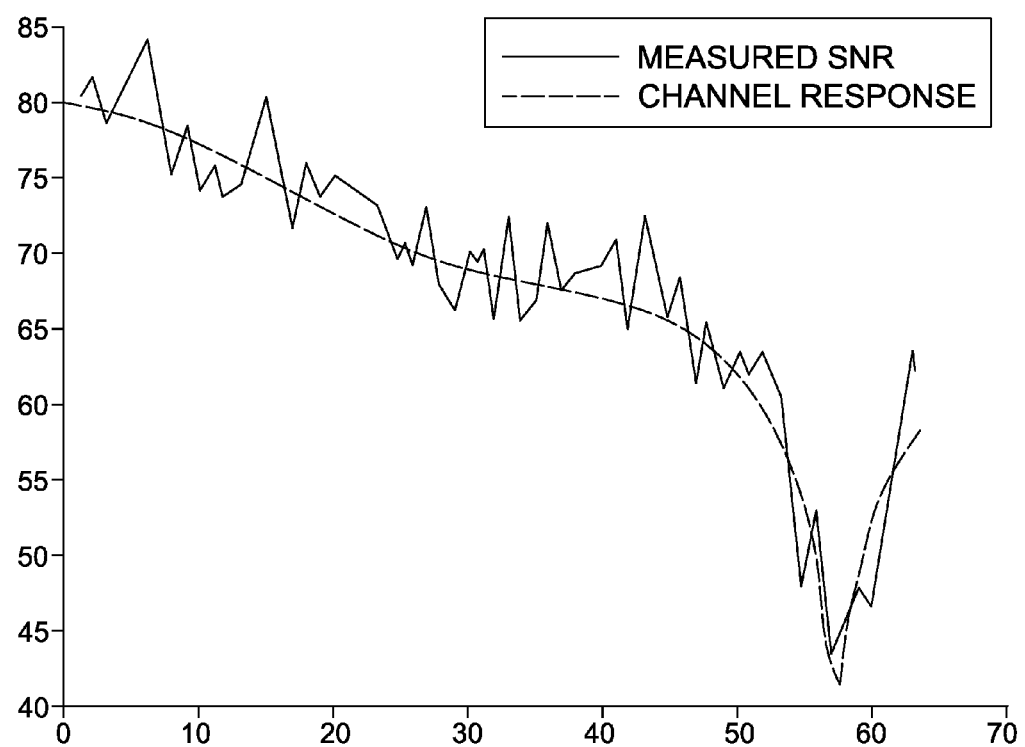
FIGS. 4A and 4B illustrate the SNR for a combined novel OFDM and OLFM system in accordance with an embodiment of the invention.
Figure 4B:
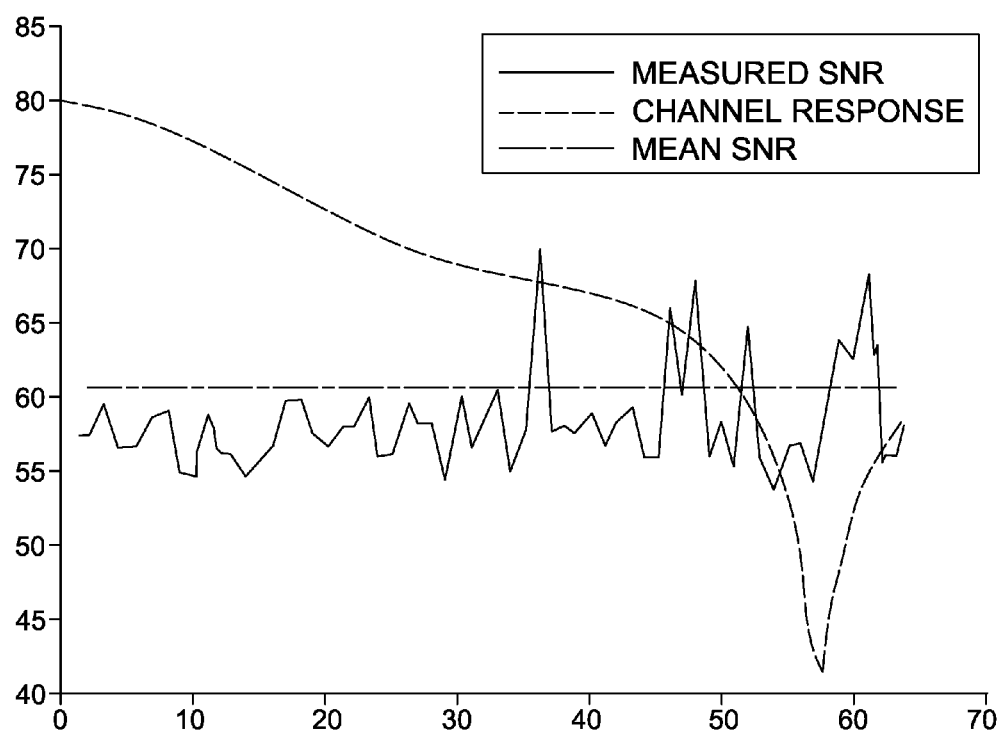

FIG. 4A illustrates the measured SNR for an OFDM system compared to the SNR of an OLFM system in FIG. 4B for a particular frequency selective channel. The channel response is overlaid for comparison.

It should be appreciated by those skilled in the art that any block diagrams herein represent conceptual views of illustrative circuitry embodying the principles of the invention.

What is claimed is:

1. A transmitter for transmitting a signal over a communications medium to a receiver, comprising:
   a data modulator for outputting a series of orthogonal sub-carriers carrying coded data;
   a linear frequency modulator for applying linear frequency modulation to said series of orthogonal sub-carriers to produce a series of sub-sweeps having orthogonal waveforms; and
   a multiplexor for producing a multiplexed output signal containing said series of sub-sweeps for transmission over said communications medium.

2. A transmitter as claimed in claim 1, wherein said multiplexor comprises an inverse Fourier transform block for converting between frequency and time domain.

3. A transmitter as claimed in claim 1, further comprising a control unit responsive to a performance metric characterizing the performance of said communications medium to adjust a bit rate assigned to said series of sub-sweeps.

4. A transmitter as claimed in claim 3, wherein said performance metric is the average signal-to-noise ratio for said sub-sweeps.

5. A transmitter as claimed in claim 3, wherein said control unit is configured to receive a response from the receiver containing an indication of the performance metric in response to a request from the transmitter.

6. A transmitter as claimed in claim 1, wherein said data modulator is a data mapper for outputting grey-coded constellation data.

7. A receiver for receiving a signal over a communications medium from a transmitter, wherein the received signal contains a series of orthogonal sub-sweeps derived from a series of orthogonal sub-carriers carrying coded data, comprising:
   a demultiplexor for demultiplexing the received signal into said series of sub-sweeps;
   a linear frequency demodulator demodulating the series of sub-sweeps to produce the series of sub-carriers carrying the coded data; and
   a data demodulator for demodulating the series of orthogonal sub-carriers produced by the linear frequency demodulator to output a data stream.

8. A receiver as claimed in claim 7, wherein the demultiplexor comprises a Fourier transform block for converting between frequency and time domain.

9. A receiver as claimed in claim 7, further comprising a control unit configured to receive a training signal from the transmitter to measure a performance metric characterizing said communications medium, and to send a response message back to the transmitter to permit the transmitter to adjust a bit rate assigned to said series of sub-sweeps.

10. A receiver as claimed in claim 9, wherein said performance metric is the average signal-to-noise ratio for said sub-sweeps.

11. In a communications system comprising a OFDM transmitter and receiver communicating data on a series of multiplexed sub-carriers, wherein the improvement comprises a linear frequency modulator is provided at the transmitter to subject the sub-carriers to linear frequency modulation to produce a series of sub-sweeps and a linear frequency demodulator is provided at the receiver to produce said sub-carriers from the received sub-sweeps.

12. A communications system as claimed in claim 11, wherein the receiver is configured to measure a global performance metric for the communications medium and send a message to the transmitter containing an indication of said global performance metric to permit the transmitter to adjust a bit rate assigned to said series of sub-sweeps.

13. A communications system as claimed in claim 12, further comprising a control unit responsive to said indication of said global performance metric to adjust said bit rate assigned to said series of sub-sweeps.

14. A method of establishing communication over a communications medium, comprising:
    creating a series of orthogonal sub-carriers carrying coded data;
    linear frequency modulating the sub-carriers to create a series of orthogonal sub-sweeps; and
    transmitting the series of orthogonal sub-sweeps as a multiplexed signal.

15. A method as claimed in claim 14, wherein the sub-sweeps are multiplexed by applying an inverse Fourier transform.

16. A method as claimed in claim 15, wherein the linear frequency modulation is applied in the frequency domain.

17. A method as claimed in claim 15, wherein the linear frequency modulation is applied in the time domain.

18. A method as claimed in claim 14, further comprising sending a request message for a performance metric indication to the receiver, receiving a response message from the receiver containing said performance metric indication, and adjusting a bit rate assigned to said series of sub-sweeps in response to said response message.

19. A method as claimed in claim 18, wherein said performance metric indication is the average signal-to-noise ratio of said sub-sweeps.

20. In a communications system comprising a transmitter and receiver communicating data on a single sub-carrier, wherein the improvement comprises a linear frequency modulator provided at the transmitter to subject the sub-carrier to linear frequency modulation to produce a sub-sweep and a linear frequency demodulator provided at the receiver to produce said sub-carrier from the received sub-sweep.

21. A transmitter for transmitting a signal over a communications medium to a receiver, comprising:
    a data modulator for outputting a series of orthogonal sub-carriers carrying coded data;
    a multiplexer for producing a multiplexed signal containing said series of orthogonal sub-carriers; and
    a linear frequency modulator for applying linear frequency modulation to said multiplexed signal containing said series of orthogonal sub-carriers to produce a series of sub-sweeps having orthogonal waveforms for transmission over the communications medium.

22. A transmitter as claimed in claim 21, wherein said multiplexer is an inverse Fourier transform block.

23. A receiver for receiving a signal over a communications medium from a transmitter, wherein the received signal contains a multiplexed series of orthogonal sub-sweeps derived from a series of orthogonal sub-carriers carrying coded data, comprising:
    a linear frequency demodulator demodulating the multiplexed series of sub-sweeps in the received signal to produce an output signal containing the sub-carriers;
    a demultiplexor for demultiplexing the output signal of the linear frequency modulator to produce the series of orthogonal sub-carriers; and
    a data demodulator for demodulating the series of orthogonal sub-carriers produced by the demultiplexor to output the coded data.

24. A receiver as claimed in claim 23, wherein the demultiplexer is a Fourier transform block.

* * * * *